United States Patent

[11] 3,581,540

| [72] | Inventor | Paul Wildi<br>San Diego, Calif. |
|---|---|---|
| [21] | Appl. No. | 797,748 |
| [22] | Filed | Feb. 10, 1969 |
| [45] | Patented | June 1, 1971 |
| [73] | Assignee | Gulf Energy & Environmental Systems, Inc.<br>San Diego, Calif. |

[54] INDUCTIVE DEVICE
5 Claims, 7 Drawing Figs.

[52] U.S. Cl. ................................................. 72/56,
336/84, 72/706
[51] Int. Cl. ........................................................ B21d 26/14
[50] Field of Search .......................................... 72/56, 706;
29/421; 336/84, 232

[56] References Cited
UNITED STATES PATENTS

| 1,251,700 | 1/1918 | Shaw | 336/84 |
| 3,210,509 | 10/1965 | Alf | 72/56 |
| 3,271,716 | 9/1966 | Furth | 72/56 |
| 3,383,890 | 5/1968 | Wildi | 72/56 |
| 3,429,159 | 2/1969 | Wildi | 72/56 |
| 3,453,634 | 7/1969 | Gilbert | 72/56 |

*Primary Examiner*—Richard J. Herbst
*Attorney*—Anderson, Luedeka, Fitch, Even and Tabin ABSTRACT: An inductive device is described such as may be utilized as a coil assembly in magnetic forming apparatus. Force exerted on a damage susceptible region of a primary conductor, as a result of magnetic pressure between the primary conductor and an adjacent secondary conductor, is relieved by an electrically floating magnetic shield disposed adjacent the damage susceptible region.

PATENTED JUN 1 1971
3,581,540
SHEET 1 OF 3
FIG. 1.
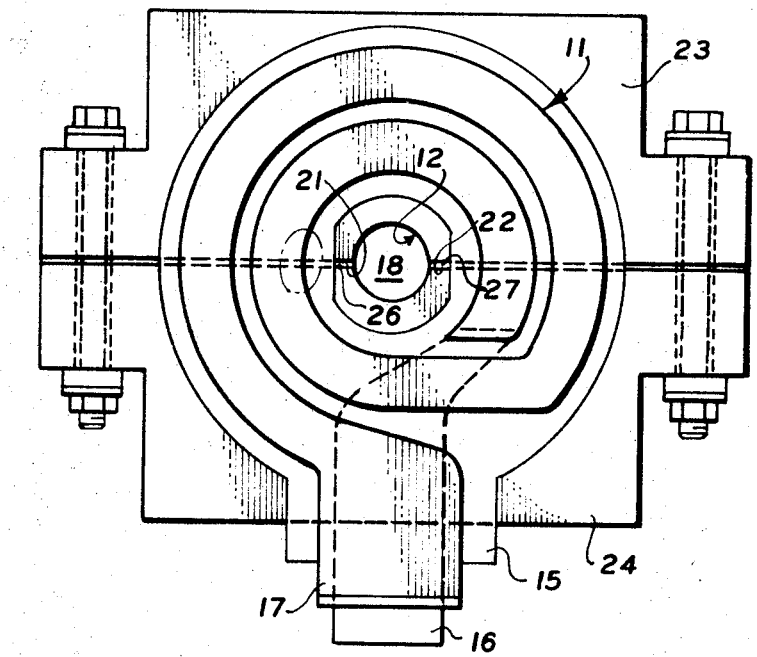
FIG. 3.
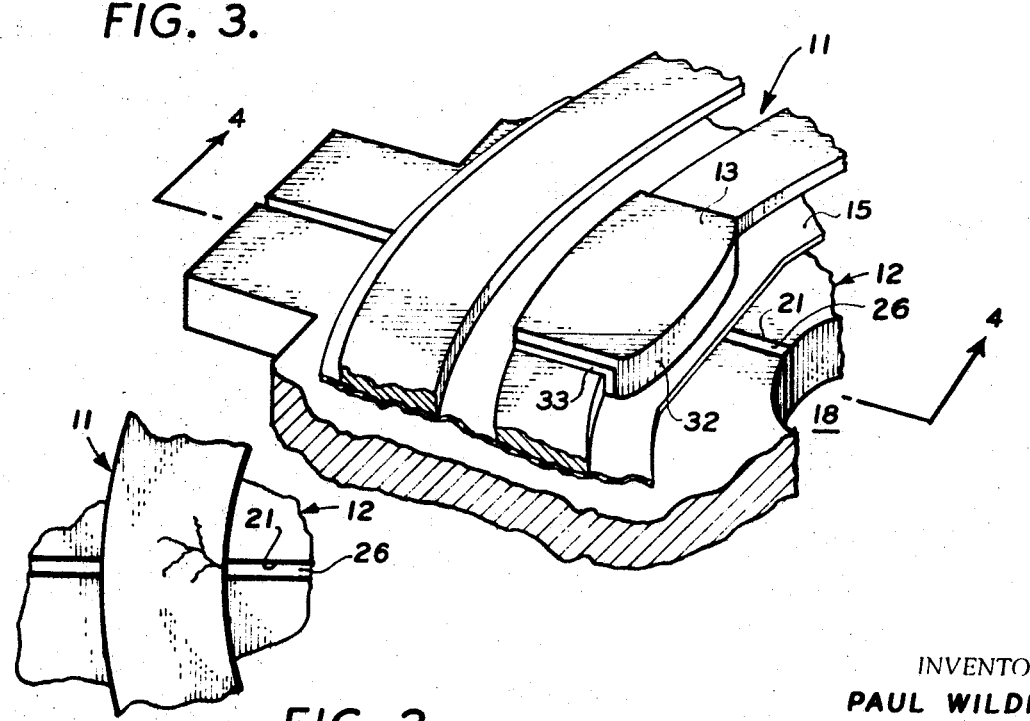
FIG. 2.
INVENTOR.
PAUL WILDI
BY
*Anderson, Luedeka, Fitch, Even & Tabin*
ATTORNEYS

INVENTOR.
PAUL WILDI

PATENTED JUN 1 1971

INVENTOR.
PAUL WILDI
BY
Anderson, Luedeka, Fitch, Even & Tabin
ATTORNEYS

INDUCTIVE DEVICE

This invention relates generally to inductive devices and, more particularly to an inductive device such as a coil assembly for use in magnetic forming apparatus.

Some types of inductive devices have a primary conductor with a region susceptible to damage from magnetic pressure between it and an adjacent secondary conductor. This problem is particularly present in certain types of coil assemblies used in magnetic forming apparatus. For example, a coil assembly for magnetic forming apparatus such as is shown and described in U.S. Pat. No. 3,383,890, issued May 21, 1968 and assigned to the assignee of the present invention, incorporates a relatively flat primary conductor and a relatively flat secondary conductor or field shaper. The field shaper has an opening therein for receiving a workpiece and is disposed relative to the primary conductor or coil such that the pulsed magnetic field produced by the coil induces a current pulse in the field shaper. This current pulse creates an intense magnetic field in the opening, inducing a current in a conductive workpiece positioned in the field. This induced current, in turn, interacts with the magnetic field produced by the current in the field shaper to produce a force acting on the workpiece.

At least one slot extending from the opening in the field shaper to its periphery is necessary to prevent the field shaper from constituting a closed loop and thereby preclude the establishment of a magnetic field in the opening. Wherever the primary conductor crosses the slot, the magnetic field density, especially near the edge of the conductor closest to the opening in the field shaper, is considerably larger than the field density near other parts of the conductor. After long periods of use in which repeated pulsing of the coil occurs, cracks may develop in the region or regions of high magnetic field density. In order to appreciably lengthen the life of the forming coil assembly, or of any inductive device wherein a similar problem exists, the primary conductor may be constructed of a material having a higher strength than that of copper which is typically used. This is not always desirable, however, since materials having a higher strength are often of less conductivity, higher price and less workability. Moreover, reinforcement of the damage susceptible region by sweating or welding a higher strength material, such as beryllium copper, to the primary conductor is a difficult and expensive operation.

Accordingly, it is an object of the present invention to provide means for relieving the magnetic pressure in damage susceptible regions in devices of the type above described.

Another object of the invention is to provide means for prolonging the life of inductive devices subject to repeated magnetic pressure loading.

Still another object of the invention is to provide an improved coil assembly for magnetic forming apparatus.

Other objects of the invention will become apparent to those skilled in the art from the foregoing description, taken in connection with the accompanying drawings wherein:

FIG. 1 is a plan view of an inductive device of the type in connection with which the pressure-relieving means of the invention is useful;

FIG. 2 is an enlarged plan view of a portion of the apparatus of FIG. 1, illustrating damage occurring in the damage susceptible region thereof when the invention is not utilized;

FIGS. 3 is a perspective fragmentary view of a portion of the apparatus of FIG. 1 in which the pressure-relieving means of the invention are incorporated;

Figure 5:
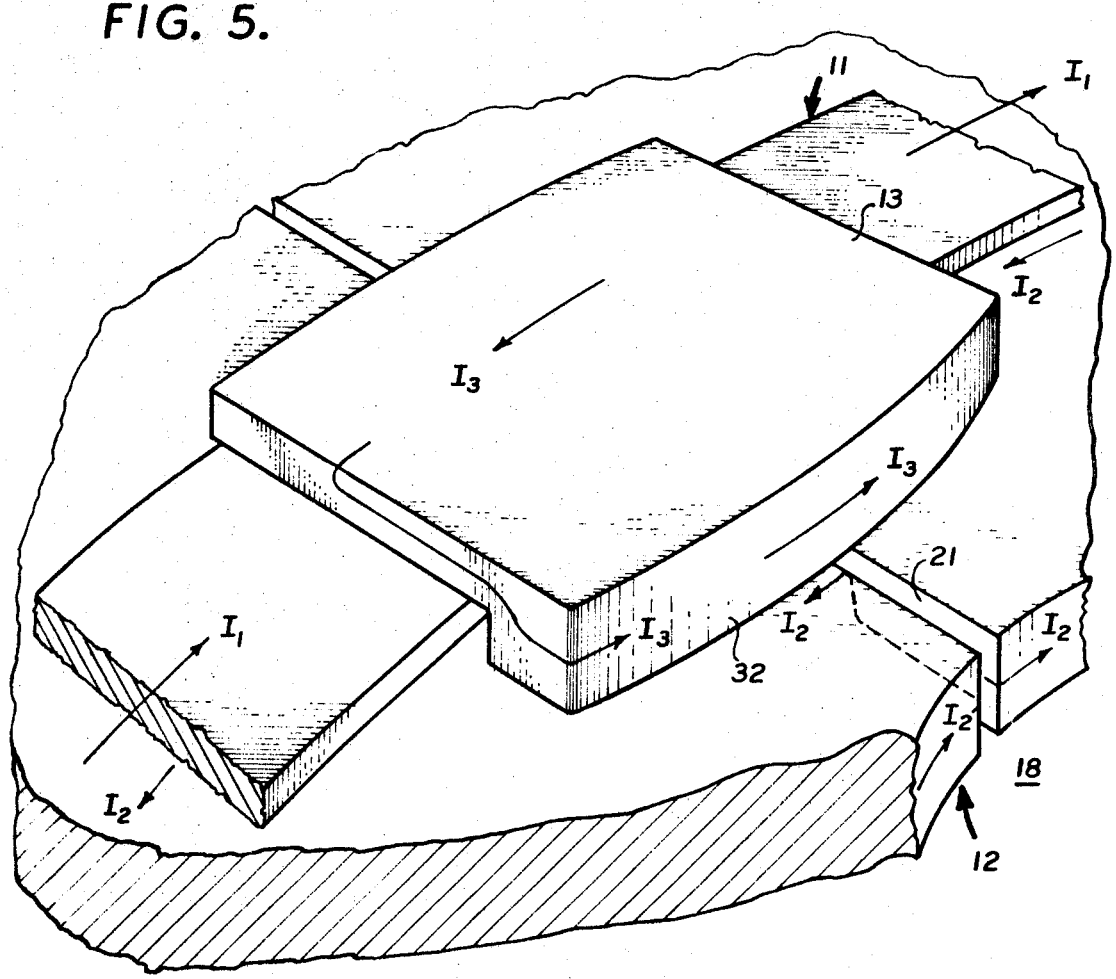
FIG. 5 is a schematic perspective illustration of how the pressure-relieving means of the invention operate.

Very generally, the invention is embodied in an inductive device having a primary conductor 11 with a region susceptible to damage from magnetic pressure between it and an adjacent secondary conductor 12. The magnetic pressure developed during current pulses applied to the primary conductor is relieved by an electrically floating magnetic shield 13 disposed adjacent to the susceptible region of the primary conductor to be inductively coupled thereto. The magnetic shield is of a material which is sufficiently conductive as to have a current induced therein by the field established by the current pulses in the primary conductor.

Referring now more particularly to FIG. 1, the inductive device illustrated therein comprises a coil assembly for use in a magnetic forming apparatus. The coil assembly includes a pair of primary conductors 11, only one of which is shown, disposed on opposite sides of a secondary conductor or field shaper 12. Each primary conductor 11 consists of a flat spiral coil of two turns, current being supplied to the coil and removed from the coil through connector plates 16 and 17. The two primary conductors and the field shaper are separated by two flat sheets of insulation 15, only one of which is visible in FIG. 1.

The field shaper 12 consists of a plate through which a central opening 18 passes. The inner surface of the field shaper at the opening 18 may be of any desired configuration to effect a corresponding configuration or deformation in the workpiece being formed. The field shaper is provided with a pair of aligned slots 21 and 22. Each of the slots extends from the outer periphery of the field shaper all the way to the opening 18. Thus, the field shaper is separated by the slots into two halves or portions 23 and 24. The two halves of the field shaper 23 and 24 are secured together by suitable insulated fastening means. The two portions of the field shaper on opposite sides of the slots are insulated from each other by layers of insulation 26 and 27 disposed, respectively, in the slots 21 and 22. The insulation may be of any suitable material having reasonable high temperature and mechanical properties, such as a phenolic compound.

Very high voltages are induced in the field shaper 12 by the coils 11 associated therewith. These high voltages, in turn, provide a current flow and induce a very strong magnetic field in the opening 18. At least one slot is necessary in the field shaper to prevent the field shaper from constituting a closed loop and thereby preclude a magnetic field from being established in the opening 18. It has been found that, on occasion, the high potential difference between the portions of the field shaper on opposite sides of a slot may cause flashover across the layer of insulation in the slot and a consequent reduction in the efficiency of the apparatus. In order to avoid such flashover, two slots rather than one are provided. This lessens the potential difference between the portions of the field shaper on opposite sides of each slot with respect to what would be the case in a single slot construction. A coil assembly for magnetic forming apparatus which is similar to that shown and described herein is shown and described in U.S. Pat. No. 3,383,890, assigned to the assignee of the present invention.

In operation, an electrical current pulse of high amperage is passed through the primary conductor or coil 11, thereby producing a pulsed magnetic field of high intensity. This magnetic field induces a current pulse in the field shaper or secondary conductor 12, producing a magnetic field in the opening 18 of very high intensity. This latter magnetic field induces a current in a conductive workpiece positioned within the opening 18. The induced current in the workpiece, in turn, interacts with the magnetic field established by the field shaper to produce a force acting on the workpiece. If the force is sufficiently strong, a deformation of the workpiece results. The shape of the deformation is dependent upon the shape of the magnetic field and the position of the workpiece relative to the field. Repeated pulses of current may be applied to the coil assembly, thus causing a series of deforming impulses to be applied to the workpiece.

In coil assemblies of the type illustrated in FIG. 1, the magnetic field density is considerably greater in those regions where the primary conductor or coil 11 crosses the slots 21 and 22 than in the other regions adjacent the coil. During periods of long use when the forming coil assembly is repeatedly pulsed, cracks may develop in the primary conductor or coil as a result of fatigue. This is particularly true on the inner edge of the innermost turn of the conductor 11, the region circled by the dash-dot line in FIG. 1. This region is shown enlarged in the fragmentary view of FIG. 2, and the cracks are illustrated therein. Although the high magnetic pressure may be relieved somewhat by slot configurations which provide a greater slot length, or by higher strength materials for the primary conductor, such solutions to the problem are not particularly desirable. More complex slot configurations tend to raise the manufacturing price and complicate assembly operations. Stronger materials tend to have lesser conductivity, a higher price, and more difficult workability. Reinforcement of the coil only in the critical area is possible, but presents a rather difficult manufacturing problem.

Figure 4:
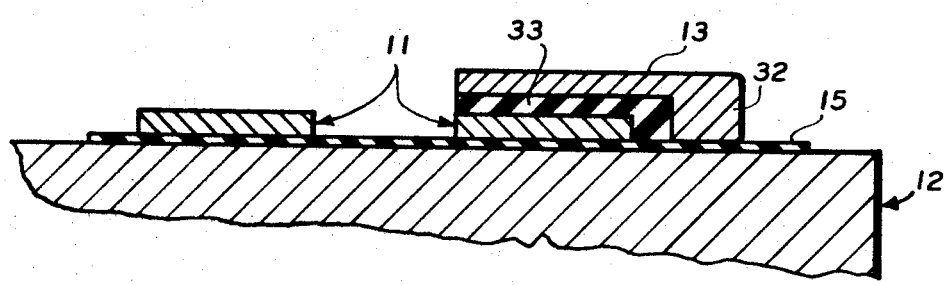
FIG. 4 is a sectional view taken along the line 4-4 of FIG. 3.

In FIGS. 3 and 4, the configuration of the inductive device of FIG. 1 modified in accordance with the invention may be seen. The electrically conductive magnetic shield 13 is provided, the shield being of generally flat configuration extending generally parallel with the primary conductor in the damage susceptible region. The shield 13 has a lip portion 32 extending perpendicular to the main portion of the shield and to the plane of the primary conductor. The lip portion extends along the innermost edge of the shield adjacent the inner edge of the innermost turn of the primary conductor. A sheet 33 of a suitable insulation material is disposed between the magnetic shield 13 and the primary conductor in order to electrically insulate the magnetic shield from the primary conductor and thus maintain the magnetic shield electrically "floating." The shield 13 relieves the high magnetic pressure in the area or region where the innermost turn of the conductor 11 crosses the slot 21.

The electrical operation of the configuration of the apparatus shown in FIGS. 3 and 4 may be seen in FIG. 5. The current $I_1$ flowing in the primary conductor 11 induces an equal and opposite current $I_2$ in the secondary conductor or field shaper 12, such current normally being referred to as the image current. The current density on the surface of the field shaper corresponds to the magnetic field density which, in turn, is related to the magnetic flux density and pressure. In the absence of the shield 13, the current $I_1$ in the primary conductor crowds toward the opening 18 as it crosses the slot, due to the higher image current density within the slot. The latter occurs because of the relatively small area of the inner faces of the field shaper in the slot as compared with the area of the surface facing the coil or primary conductor. The crowding of current in the Primary conductor toward the opening 18 creates the mentioned higher pressure in the damage susceptible region.

In the presence of the shield 13, the higher current density is generated on the shield. The currents $I_3$ on the leading edge of the shield are closed within the electrically floating shield, passing across the top and bottom surfaces thereof. The corresponding image currents of the current in the shield are produced within the primary conductor. This alleviates the crowding of the current toward the inner edge of the conductor. The closer the magnetic coupling of the shield to the primary conductor, the greater its effectiveness.

Although theoretically, the shield may be placed between the primary conductor and the secondary conductor, it is more desirable to have a close coupling between the secondary conductor and the primary conductor. Accordingly, the preferred placement of the magnetic shield is as illustrated. In this placement, the bulk of the magnetic shield may be readily accommodated by a suitable recess in the insulation, not shown, which is placed against the primary conductor on the opposite side thereof from the secondary conductor. Such insulation is shown in the aforementioned U.S. Pat. No. 3,383,890.

Figure 6:
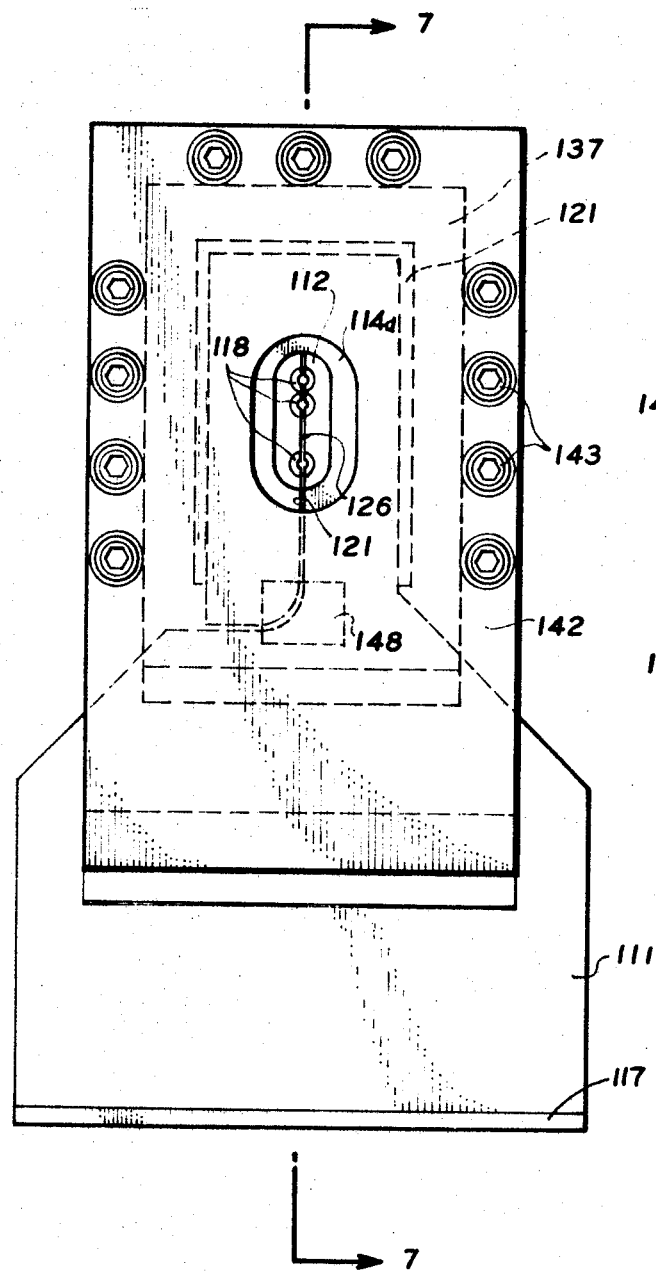
FIG. 6 is a plan view of an alternative embodiment of the invention.
Figure 7:
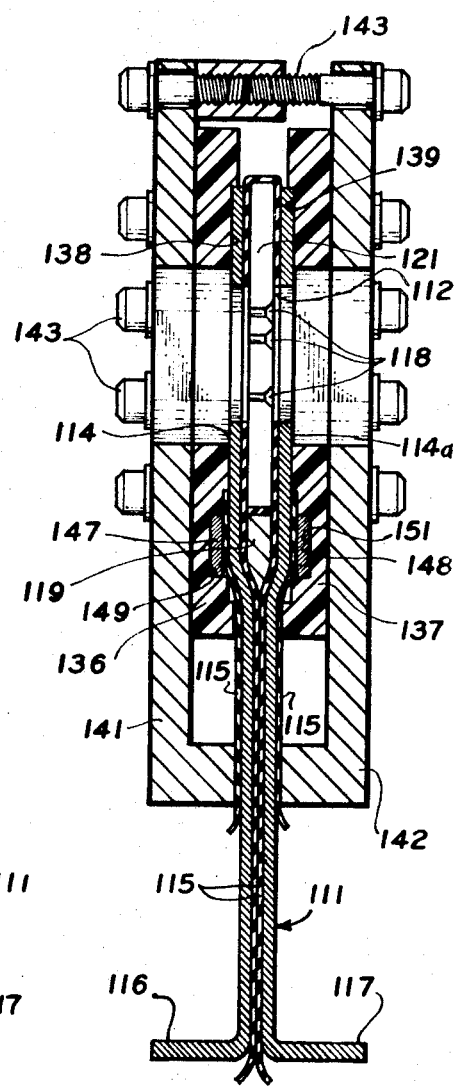
FIG. 7 is a sectional view taken along the line 7-7 of FIG. 6.

Referring now more particularly to FIGS. 6 and 7, an alternative embodiment of the invention is shown. The embodiment of FIGS. 6 and 7 is also a coil assembly for use in magnetic forming apparatus. The coil assembly includes a primary conductor 111 having connector flanges 116 and 117. The primary conductor 111 forms a two-turn coil, one turn 114 of which is on one side of a shaper plate or secondary conductor 112, and the other turn 114a of which is on the opposite side of the shaper plate. The shaper plate 112 is provided with a plurality of openings 118 therein in which several small parts may be swaged simultaneously. Electrical connection between the two turns of the primary conductor 111 is made by a conductive metal block 119.

A pair of phenolic resin plates 136 and 137 are disposed on opposite sides of the conductor 111, each being formed with a recess 138 and 139, respectively, for accommodating the conductor. A pair of metal plates 141 and 142 complete the sandwich assembly, being bolted together by suitable bolts 143 to form a rigid and secure structure.

As may be seen in FIG. 6, the field shaper or secondary conductor 112 includes a slot 121 therein, being separated into two halves thereby for the same reasons as those given in connection with the field shaper of the previous embodiment. The slot 121 is provided with a sheet 126 of insulation material therein. In the region where the primary conductor crosses the slot, at the inner edge of the primary conductor, cracks may result after repeated pulsing of the device. To alleviate the magnetic pressure, a pair of electrically floating magnetic shields 147 and 148 are provided adjacent the regions on each turn of the coil which are subject to the high magnetic pressure. The shields operate in the same manner as the shields in the previous embodiment, and are accommodated in recesses 149 and 151, respectively, in the insulators 136 and 137. The electrically floating magnetic shields 147 and 148 operate to relieve the magnetic pressure in the critical area of the primary conductor, which might otherwise be subject to damage after repeated pulses. Sheets 115 of insulation separate the magnetic shields from the primary conductor.

Although described herein in connection with coil assemblies for magnetic forming apparatus, the invention is applicable to any inductive device having a primary conductor with a region susceptible to damage from magnetic pressure between it and an adjacent secondary conductor. The floating magnetic shield, which is a good conductor, by virtue of currents induced in the shield, reduces the magnetic field density on a sensitive conductor of the device. Thus, certain transformer configurations may effectively utilize the invention.

It may therefore be seen that the invention provides an improved construction for an inductive device in which high magnetic pressure in critical regions is effectively relieved. The cost of the construction of the invention is considerably less than that of other possible solutions to the problem. Moreover, manufacturing operations are relatively simple and existing devices may be modified, in accordance with the invention, relatively easily.

Various modifications of the invention in addition to those shown and described herein will become apparent to those skilled in the art from the foregoing description and accompanying drawings. Such modifications are intended to fall within the scope of the appended claims.

I claim:

1. An inductive device comprising, a generally flat primary conductor, a generally flat secondary conductor disposed adjacent to said primary conductor and generally parallel thereto, said secondary conductor being inductively coupled to said primary conductor and having a nonconductive slot therein extending generally in a direction transversely of said primary conductor, and a magnetic shield disposed adjacent the region of said primary conductor adjacent said slot, said magnetic shield being electrically separated from both said primary conductor and said secondary conductor, said magnetic shield being inductively coupled to said primary conductor and being of a material which is electrically conductive so as to have a current induced therein by a field established by current pulses in said primary conductor.

2. Apparatus according to claim 1 wherein said primary and secondary conductors are of generally flat shape disposed parallel to each other, wherein said secondary conductor has a nonconductive slot therein, and wherein said susceptible region comprises the region of said primary conductor adjacent to said slot.

3. Apparatus according to claim 1 wherein said primary conductor is of spiral configuration and wherein said susceptible region is located at the inner edge of the innermost turn.

4. Apparatus according to claim 3 wherein said magnetic shield comprises a plate having a main flat portion generally parallel with said primary conductor in said susceptible region and insulated therefrom, and further comprises a lip portion extending perpendicularly of said primary conductor along the innermost edge of said main flat portion and adjacent to the inner edge of the innermost turn.

5. Apparatus according to claim 1 wherein said primary conductor comprises a coil having at least one turn, wherein said secondary conductor comprises a field shaper defining at least one opening for receiving a piece to be formed, said opening having an axis extending within the periphery of the turn of said primary conductor, said slot in said field shaper extending from said opening to the periphery of said field shaper.